United States Patent [19]

Miyashita et al.

[11] 4,193,644
[45] Mar. 18, 1980

[54] SERVO CONTROL SYSTEM

[75] Inventors: Masakazu Miyashita, Kokubunji; Akira Kanai, Higashiyamato, both of Japan

[73] Assignee: Citizen Watch Co., Ltd., Tokyo, Japan

[21] Appl. No.: 890,908

[22] Filed: Mar. 28, 1978

[30] Foreign Application Priority Data

Apr. 7, 1977 [JP] Japan .................................. 52-39738
Apr. 26, 1977 [JP] Japan .................................. 52-48028

[51] Int. Cl.$^2$ .............................................. F16C 35/00
[52] U.S. Cl. ............................................ 308/9; 308/122
[58] Field of Search ................... 308/9, 121, 122, 5 R, 308/1 A, 73, 3 A, 3 R, DIG. 1

[56] References Cited

U.S. PATENT DOCUMENTS

| | | | |
|---|---|---|---|
| 3,053,589 | 9/1962 | Cameron | 308/122 |
| 3,617,102 | 11/1971 | Wada et al. | 308/122 |
| 3,658,393 | 4/1972 | Luthi | 308/122 X |
| 3,742,653 | 7/1973 | Kano et al. | 308/122 X |

*Primary Examiner*—Douglas C. Butler
*Attorney, Agent, or Firm*—Sherman & Shalloway

[57] ABSTRACT

A servo control system which can automatically control a position of a hydrostatically supported member such as a table of a machine tool, rotary shaft or the like is disclosed. The system comprises a closed loop control system including a differential amplifier for effecting a subtraction operation between an amount of displacement of a member and an amount of reference signal and a servo amplifier delivering a control signal and a servovalve for supplying operating pressure upon receipt of the control signal to the member, whereby the position of the member is controlled by the pressure applied thereto.

6 Claims, 14 Drawing Figures

SERVO CONTROL SYSTEM

BACKGROUND OF THE INVENTION

1. Field of the Invention

This invention relates to a servo control system which can automatically correct a position of a hydrostatically supported member such as a table of a machine tool, rotary shaft or the like.

2. Description of the Prior Art

In general, in order to minutely move a member for the purpose of determining its position or correcting its position, use must be made of a positioning apparatus which can reciprocate the member without backlash, which is not subjected to disturbance, which does not vibrate the member under dynamic loads, which is a large dynamic stiffness and which can control a minute amount of displacement of the member.

The positioning apparatus can reciprocate the member without backlash if the apparatus is operated under the following conditions. That is, a preload of the maximum external load is subjected between a positioning portion of a positioning mechanism and a positioned portion thereof in a driving direction. The amount ot backlash is measured beforehand and the amount of backlash thus measured in advance is compensated when the member is reciprocated as in the case of a NC (numerically-controlled) positioning system. However, in the former case, the load subjected to the positioning mechanism becomes increased by the surplus load to increase the elastic deformation of the positioning mechanism, thereby increasing a positioning error. In the latter case, it is impossible to correct the irregular amount of play due to change in load.

In order to control a minute amount of movement of the movable body, it has been the common practice to move the movable body by minutely deforming a supporting member with the aid of adjustment of a spring force or electromagnetic force, by making use of an elastic deformation of a magnetostrictive element. However, the former apparatus is based on a principle of utilizing the elastic deformation of the supporting member caused by the external force, so that the positioning apparatus is limited in its stiffness and the positioning accuracy under the variable load is also limited.

The latter apparatus is superior in the stiffness of supporting member to the former apparatus, but is always subjected to hysteresis effect induced in the supporting member formed of the magnetostrictive element due to is magnetic property when the element reciprocates.

In order to overcome the above mentioned drawbacks, it has recently been proposed to make use of a hydrostatic bearing for supporting a positioning mechanism. The hydrostatic bearing is provided with two hydrostatic pads arranged at opposite sides of the member or the supporting member and supplied with pressures which are different from each other by a set value, whereby minutely moving the member. Such hydrostatic bearing is relatively high in rigidity and subjected to less hysteresis action, so that it is suitable for minutely moving the member. But, the above-described apparatus constitutes an open loop control mechanism from control technological standpoint of view and hence its positioning accuracy is directly limited by an accuracy of adjusting the pressure supplied to the hydrostatic bearing.

In addition, in order to reduce a deviation of a rotational center of the rotary shaft supported by the hydrostatic bearing, it has been the common practice to work the rotary shaft and the bearing thereof with a high accuracy. The accuracy thus obtained, however, is dependent on the accuracy in machining of the parts, so that the rotatory accuracy is subject to its machining accuracy. In addition, when the rotary shaft is rotated, a dynamic pressure induced in the bearing tends to displace a rotational center of the rotary shaft.

When various kinds of members such as a table of a machine tool are moved along any guide surface, the member tends to lower a motion accuracy with the influence of the accuracy in configuration of the member per se or the guide surface thereof.

SUMMARY OF THE INVENTION

The present invention is based on the above mentioned recognition.

An object of the invention, therefore, is to provide a servo control system which can correct a minute position, for example, on the order of $1/100$ $\mu$m of a member without backlash in reciprocation and without producing vibrations under dynamic loads and which has a large dynamic stiffness.

Another object of the invention is to provide a servo control system which can automatically correct an accuracy of movement of a member irrespective of the influence of causes such as machining accuracy of constitutional elements, etc.

A feature of the invention is the provision of a servo control system comprising a base means, supporting member fixed to said base means, a pair of hydrostatic pads provided in said supporting member or a member which is hydrostatically supported in said supporting member with a set gap formed therebetween, a displacement detector provided on said holding member and detecting an amount of movement of said member relative to said supporting member, a reference signal generator for generating a correction signal, a differential amplifier for delivering a difference signal between a detection signal delivered from said displacement detector and said correction signal delivered from said signal generator, a servovalve for supplying an operating pressure corresponding to said difference signal delivered from said differential amplifier to said pair of hydrostatic pads, and a servo amplifier to amplify and transmit said difference signal to said servovalve.

Other objects, features and advantages of the invention will become apparent upon a perusal of the following specification taken in connection with the accompanying drawings.

DETAILED DESCRIPTION OF THE PREFERRED EMBODIMENTS

Figure 1:
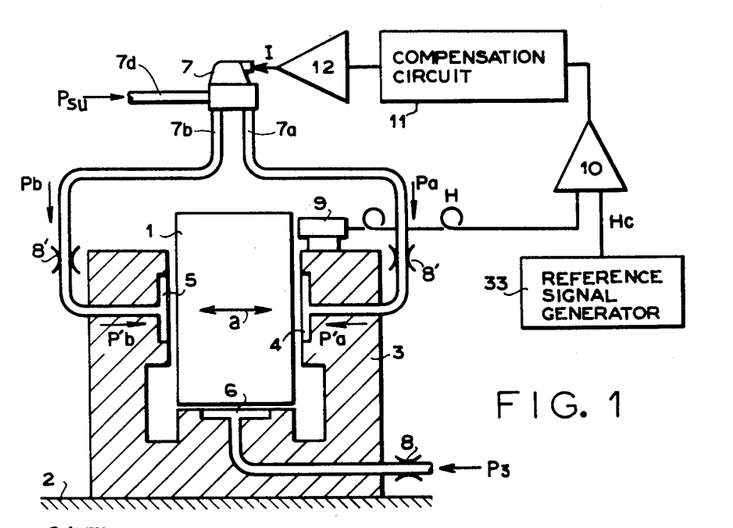
FIG. 1 is a schematic longitudinal sectional view of one embodiment of a servo control system according to the invention.

Referring now to FIG. 1, there is shown one embodiment of a servo control system according to the invention. The servo control system includes a supporting member 3 fixed to a foundation surface plate 2 as a base means and three hydrostatic pads 4, 5 and 6 provided in the supporting member 3. These three hydrostatic pads 4, 5, and 6 function to hydrostatically support a member 1, which is an object whose position is to be determined, in the supporting member 3 with a set gap formed therebetween. Provision is made of one stage amplifier type servovalve 7 which does not include a spool valve. The servovalve 7 is controlled so as to divide a supply pressure PSN into pressure Pa and Pb, and thereby supplying pressures P'a and P'b to the right side hydrostatic pad 4 and left side hydrostatic pad 5 respectively and hence to minutely displace the member 1 in horizontal direction shown by arrows a in FIG. 1. The construction and operation the servovalve 7 will be described later. The hydrostatic pad 6 provided at the lower surface of the supporting member 3 is subjected through a restrictor 8 to a constant pressure $P_3$ and functions as a hydrostatic supporting mechanism for supporting the member 1 at a set vertical position in the supporting member 3 with a gap formed therebetween. The supporting member 3 is provided at its upper surface with a displacement detector 9, which is conventional, for detecting a displacement of the member 1 relative to the supporting member 3. The displacement detector 9 is opposed to the horizontal direction of the member 1, that is, opposed to the direction in which the position of the member 1 is to be determined. Provision is made of a differential amplifier 10 connected to the displacement detector 9 and to a reference signal generator 33 and supplied from the displacement detector 9 with a position reading signal H and from the reference signal generator 33 with a reference position signal Hc. An output signal from the differential amplifier 10 is supplied through a compensation circuit 11 and a servo amplifier 12 to the servovalve 7 as its control signal I.

In the system of the invention constructed as above described, the servovalve 7 functions to supply operating pressures P'a, P'b to the opposed hydrostatic pads 4 and 5 in a differential manner in response to the control signal I applied to the servovalve 7 to move the member 1. If the member 1 is not subjected to the external force, the pressures P'a P'b supplied through a restrictor 8' to both the hydrostatic pads 4, 5 are required to be balanced after the member 1 has been moved by a distance defined by the reference position signal Hc from the reference signal generator 33.

Figure 2:
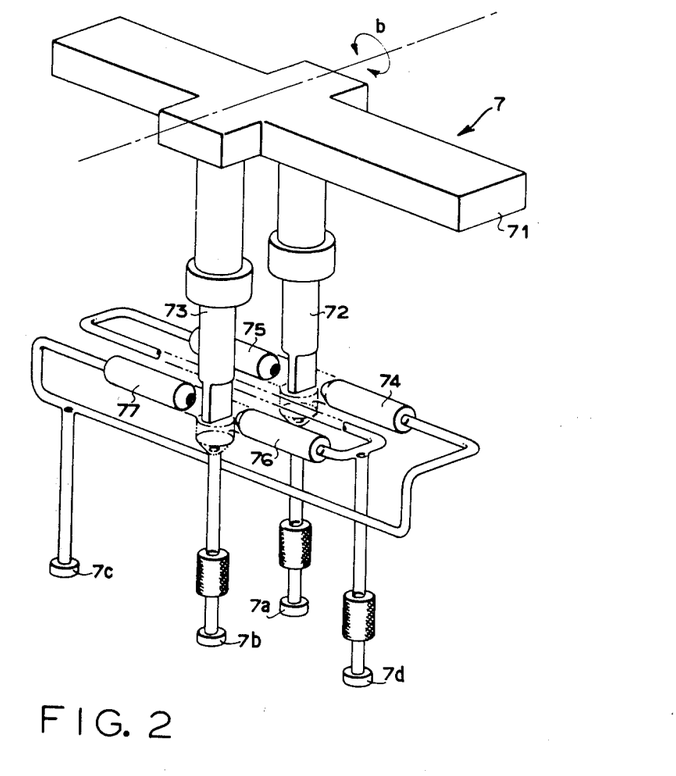
FIG. 2 is a perspective view of a servovalve used for the system shown in FIG. 1.

FIG. 2 shows an example of the servovalve 7 as constructed so as to exhibit the above described ability. Referring to FIG. 2, reference numeral 71 designates an armature of a torque motor whose magnet and coil are not shown in FIG. 2; 72, 73 depict flappers fixed to the armature 71; 74, 75, 76, 77 illustrate nozzles; 7a, 7b denote control ports; 7c shows a drain port and 7d indicates a pressure supply port. The control ports 7a, 7b are connected through the restrictors 8' to the hydrostatic pads 4, 5 shown in FIG. 1, respectively, and the drain port 7c is normally connected to an oil tank not shown, but in this embodiment the drain part 7c is closed.

If the control signal I supplied from the servo amplifier 12 to the servovalve 7 is zero, the pressure and the amount of flow of operating fluid, for example, oil delivered from the control ports 7a, 7b are equal with each other, respectively, thereby stopping the member 1 at a center position between the hydrostatic pads 4 and 5. If there is not zero the control signal I delivered from the servo amplifier 12 to the servovalve 7 for moving the armature 71 in either direction of arrows b, the armature 71 as well as its flappers 72, 73 become displaced such that a gap between the flapper 72 and the nozzle 75 is increased and a gap between the flapper 73 and the nozzle 76 is decreased and vice versa. As a result, the pressures Pa, Pb supplied to the control ports 7a and 7b become unbalanced, thereby producing a pressure difference between the operating pressure P'a to the hydrostatic pad 4 and the operating pressure P'b to pad 5. Thus, the member 1 moves in either one of directions until the pressure difference between the hydrostatic pads 7a, 7b becomes zero. When the pressure difference between the operating pressure P'a and P'b the hydrostatic pads 4, 5, becomes zero, the member 1 is stopped. In greater detail, when the member 1 is required to move in the left direction of the arrows a in FIG. 1, the armature 71 of FIG. 2 is moved in the counterclockwise direction of the arrow b so that the flapper 72 and nozzle 75 may open and the flapper 73 and nozzle 76 may close and thereby the supply pressure Psu being sufficiently supplied to the side of the control port 7a through the nozzle 75. As the result, the pressure Pa is supplied to the hydrostatic pad 4 so that the member 1 may move in the left direction of the arrows a in FIG. 1. On the other hand, the above operation is visa versa when the member 1 is required to move in the right direction of the arrows a in FIG. 1.

As seen from the above, the system according to the invention provides a closed loop control system which can compare the amount of the reference position signal Hc with the amount of movement of the member 1 defined by the position reading signal H from the displacement detector 9 and which can correct the movement of the member 1 until the above two amounts become equal with each other. As a result, the stop position of the member 1 substantially completely coincides with the amount of reference position signal Hc. Initially the operation pressures P'a and P'b are equal to each other. The armature 71 of FIG. 2 is moved in the counterclockwise direction of the arrow b so that a gap between the flapper 72 and the nozzle 75 are widened and a gap between the flapper 73 and the nozzle 76 are narrowed. Then the pressure Pa becomes higher than the pressure Pb and thereby the pressure P'a becoming higher than the pressure P'b. As the result, the member 1 may move in the left direction of the arrows a in FIG. 1.

The above mentioned servovalve 7 may be replaced by a flow controlling servovalve including a spool guide valve. In this case, use may be made of two servovalves each including a three-way guide valve or four-way guide valve. Alternatively, one servovalve including a four-way guide valve whose amount of lap is adjusted may also be used. But, the use of the conventional servovalve including the spool guide valve renders it not possible to obtain an accuracy which is the same as that accuracy which is obtained by the servovalve 7 shown in FIG. 2. It is preferable, therefore, to use the servovalve not including the spool guide valve as shown in FIG. 2.

The operation of the system shown in FIG. 1 will now be described. If the reference position signal Hc is supplied to the differential amplifier 10, the differential amplifier 10 functions to effect subtraction operation between the reference position signal Hc and the position reading signal H delivered from the displacement detector 9 corresponding to the relative displacement between the member 1 and the supporting member 3 to produce an error signal and amplify this signal. The error signal thus amplified is supplied through the compensation circuit 11 and the servo amplifier 12 to the servovalve 7 as its control signal I.

The servovalve 7 functions to control a ratio of the pressure distributed from the supply pressure Psu to the right hydrostatic pad 4 to the pressure distributed from the supply pressure Psu to the left hydrostatic pad 5 such that the difference between the position reading signal H and the reference position signal Hc becomes zero and that the member 1 positioned at the place corresponding to the reference signal.

That is, the servo control system shown in FIG. 1 functions to detect an error E (FIG. 3) with respect to the reference position signal Hc and apply the force corresponding to the error E thus detected through the hydrostatic pads 4, 5 to the member 1 which is the object whose position is to be determined so as to correct the position of the member 1. As a result, the system according to the invention provides "a servo control system which makes use of a force as its operation value" and is capable of positioning the member with a high accuracy.

The compensation circuit 11 inserted between the differential amplifier 10 and the servo amplifier 12 functions to adjust a characteristic, for example, a steady state characteristic of the apparatus according to the invention. Therefore the compensation circuit 11 is not always required in the system of the invention.

Experimental tests on the system according to the invention shown in FIG. 1 have yielded the following result.

In the experimental tests, use was made of the following constitutional elements under the following conditions.

Weight of the member 1: 20 kg
Effective sectional area of each of the hydrostatic pads 4, 5: 63.8 cm$^2$
Gap between the 1 and the holding member 3: 50 $\mu$m
Pressure Psu supplied to the servovalve 7: 40 kg/cm$^2$
Sensitivity of the displacement detector 9: 400 mV/$\mu$m.

Figure 3:
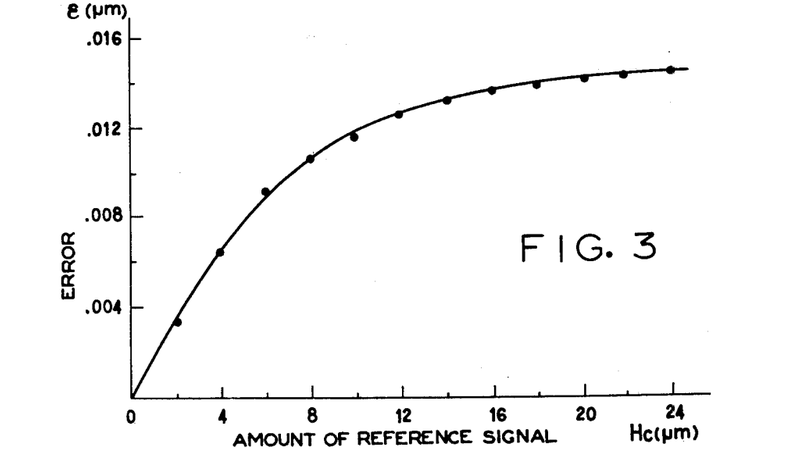
FIG. 3 is a graph showing a steady state characteristic of the system shown in FIG. 1.

FIG. 3 illustrates the test result showing the steady state characteristic of the system shown in FIG. 1. In FIG. 3, the error $\epsilon$ is plotted on the ordinate as a function of the the amount of reference position signal Hc plotted on the abscissa. The reference position signal Hc was supplied to the differential amplifier 10 as a voltage signal corresponding to that displacement amount of determining position which is determined by the displacement-output signal characteristic of the displacement detector 9, which the error $\epsilon$ was detected as the output signal from the differential amplifier 10. As seen from FIG. 3, the curve showing the relation between the amount of reference signal Hc and the error $\epsilon$ is non-rectilinear. If the amount of reference position signal Hc is increased, the error $\epsilon$ becomes decreased. If the reference position signal Hc exceeds 24 $\mu$m, it is impossible to determine the position of the member 1. Conversely, if the amount of reference position signal Hc is decreased, the error $\epsilon$ becomes increased. The system according to the invention is capable of moving the member 1 for a distance of $\pm 24$ $\mu$m when the gap between the member 1 and the supporing member 3 is 50 $\mu$m. The member body 1 can be positioned with an accuracy that 0.06% of error $\epsilon$ with respect to the maximum amount of reference position signal Hc of 24 $\mu$m and with an accuracy that 0.17% of error $\epsilon$ with respect to the amount of reference position signal Hc of 2 $\mu$m.

Figure 4A:
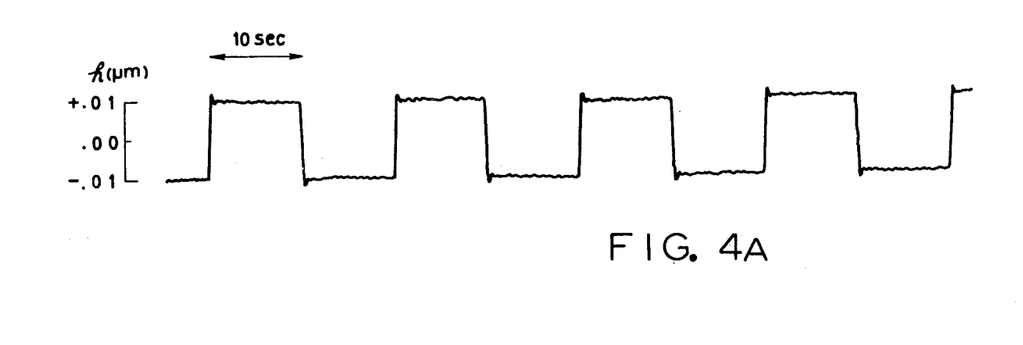
FIGS. 4A, 4B, 5A and 5B are graphs showing amounts of displacement and error with respect to set amount of correction signal.

FIG. 4A shows the amount h of displacement of the member 1 when the amount of reference position signal Hc is $\pm 0.01$ $\mu$m.

Figure 4B:
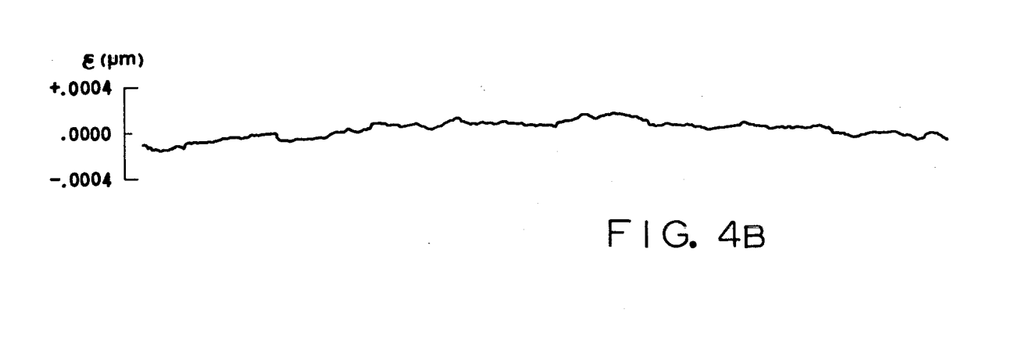

FIG. 4B shows the error $\epsilon$ when the amount of reference signal Hc is $\pm 0.01$ $\mu$m. As seen in FIGS. 4A and 4B, it is possible to determine the position of the member 1 within an error range of the 0.0002 $\mu$m when the amount of reference position signal Hc is $\pm 0.01$ $\mu$m.

Figure 5A:
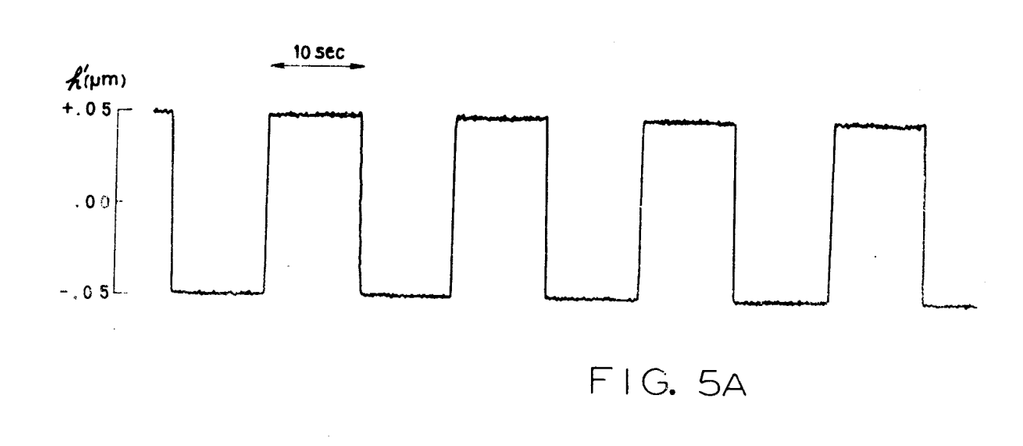
Figure 5B:
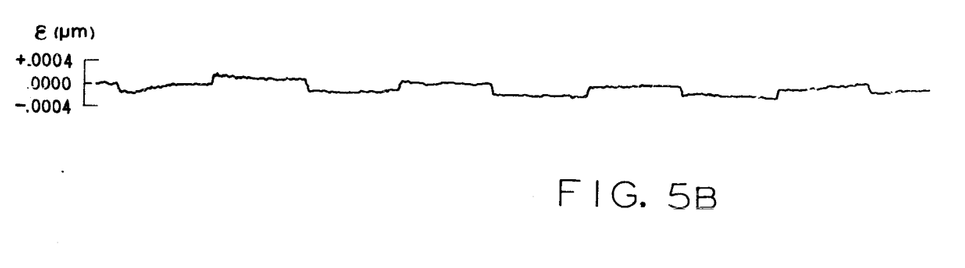

FIG. 5A shows the amount h' of displacement of the member 1 when the amount of the reference position signal Hc is $\pm 0.05$ $\mu$m. FIG. 5B shows the error $\epsilon$ when the amount of the reference position signal Hc is $\pm 0.05$ $\mu$m. As seen from FIGS. 5A and 5B, it is possible to position the member 1 within an error range of 0.0004 $\mu$m when the amount of the reference position signal Hc is $\pm 0.05$ $\mu$m.

It is impossible to directly measure the static stiffness of the system by the experimental tests. But the system according to the invention constitutes a closed loop control system, so that the stiffness thereof is extremely high of the order of $10^3$ kg/$\mu$m.

As stated hereinbefore, the servo control system according to the invention is capable of controlling pressures supplied to hydrostatic pads so as to change a gap between the member and the hydrostatic pads and hence to minutely move the member and capable of detecting the amount of movement of the member and feeding back it so as to correct the difference between the amount of movement thus detected and the amount of a reference position signal, whereby precisely positioning the member. If use is made of a displacement detector having a high sensitivity, it is possible to position member within an error on the order of 0.0001 $\mu$m when the amount of the reference position signal is on the order of 0.01 $\mu$m with the stiffness on the order of $10^3$ kg/$\mu$m in the driving direction of the member. As a result, the invention significantly contributes in various industrial fields inclusive of a machine tool.

Figure 6:
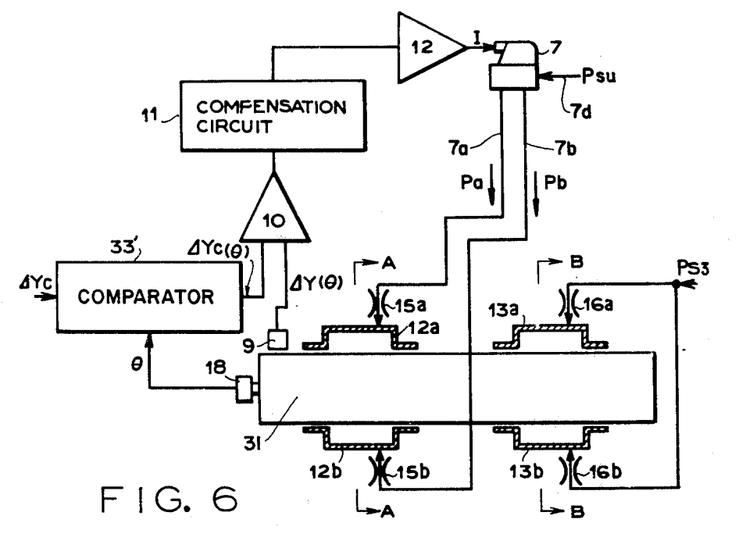
FIG. 6 is a schematic longitudinal sectional view of another embodiment of a servo control system according to the invention.
Figure 7:
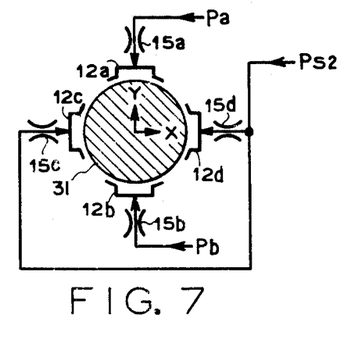
FIG. 7 is a section along line A—A of FIG. 6.
Figure 8:
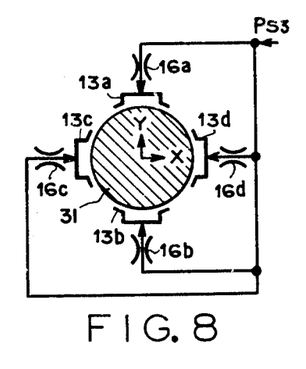
FIG. 8 is a section along line B—B of FIG. 6.

FIGS. 6 to 8 show another embodiment of a servo control system according to the invention. In FIGS. 6 to 8, reference numeral 31 designates a rotary shaft supported at its left end by a set of four hydrostatic pads 12a, 12b, 12c, 12d and at its right end by a set of four hydrostatic pads 13a, 13b, 13c, 13d. The rotary shaft 31 is rotated by a driving mechanism not shown.

As shown in FIG. 7, a pair of opposed hydrostatic pads 12a and 12b function to support the rotary shaft 31 in Y direction and the remaining hydrostatic pads 12c and 12d function to support the rotary shaft 31 in X direction.

Similarly, a pair of opposed hydrostatic pads 13a and 13b function to support the rotary shaft 31 in Y direction and the remaining hydrostatic pads 13c and 13d function to support the rotary shaft 31 in X direction as shown in FIG. 8.

As shown in FIGS. 6 and 7, pressures Pa and Pb are supplied from a servovalve 7 through fixed restrictors 15a and 15b to the hydrostatic pads 12a and 12b, respectively. A constant pressure Ps2 is supplied through fixed restrictors 15c and 15d to the hydrostatic pads 12c and 12d, respectively. A constant pressure Ps3 is supplied through restrictors 16a to 16d to the hydrostatic pads 13a to 13d, respectively.

Provision is made of a displacement detector 9 for detecting a radial displacement of the rotary shaft 31 at the left and in Y direction in its radial direction. In addition, provision is made of a rotary angle detector 18 for detecting a rotary angle of the rotary shaft 31. The rotary angle detected by the rotary angle detector 18 is supplied to a comparator 33'.

The comparator 33' functions to memorize as a datum a reference position signal $\Delta Yc$ and to deliver a synchronism correction signal $\Delta Yc(\theta)$ to a differential amplifier 10 in response to a rotary angle signal $\theta$ delivered from the rotary angle detector 8.

The reference position signal $\Delta Yc$ defines an amount of correction every one rotation of the rotary shaft 31 necessary for rotating the rotary shaft 31 without a deviation of a rotational center at the left end in Y direction and is read out by the comparator 33' in response to the rotary angle signal $\theta$ so as to produce the synchronism correction signal $\Delta Yc(\theta)$ representing the amount of correcting a deviation of a rotational center.

The synchronous correction signal $\Delta Yc(\theta)$ is subjected at the differential amplifier 10 to produce an error signal between the synchronism correction signal $\Delta Yc(\theta)$ and an output signal $\Delta Yc(\theta)$ delivered from the displacement detector 9 to rotate the rotary shaft 31 without the deviation of the rotational center. The error signal thus obtained is supplied from the differential amplifier 10 through the compensation circuit 11 and the servo amplifier 12 to the servovalve 7. The compensation circuit 11 functions to improve its characteristics, for example, a steady state characteristic of the system according to the invention.

The servovalve 7 functions to control a ratio of the pressure Pa supplied to the hydrostatic pad 12a to the pressure Pb supplied to the hydrostatic pad 12b in accordance with the control signal I delivered from the servo amplifier 12. The servovalve 7 is supplied with the supply pressure Psu. If the ratio of the pressure Pa to the pressure Pb becomes changed, the difference pressure between the hydrostatic pads 12a and 12b becomes out of balance. As a result, the rotary shaft 31 is moved in Y direction. This displacement of the rotary shaft 31 in Y direction is effected as compared with the correction signal $\Delta Yc$ in such direction that the displacement of the rotational center of the rotary shaft 31, that is, deviation of the rotational center thereof is eliminated. As a result, it is possible to automatically correct the deviation of the rotational center of the rotary shaft 31 with a high accuracy.

The amount of displacement of the rotary shaft 31 in Y direction is detected by the displacement detector 9 to deliver the output signal $\Delta Y(\theta)$ and thereby the deviation of the rotational center being corrected. The difference between the output signal $\Delta Y(\theta)$ and the synchronism correction signal $\Delta Yc(\theta)$ from the comparator 33' is supplied to the servovalve 7 as its control signal I.

The above described correction operation due to the closed circuit can correct the deviation of the rotational center inherent to the rotatory system, deviation of the rotational center due to the hydrodynamic effect and displacement of the rotation center caused by the external force exerted to the rotary shaft 31 with a high accuracy in a stable manner.

In the embodiment shown in FIGS. 6 to 8, both the detection of displacement and the correction of positioning deviation of the rotational center of the rotary shaft 31 are effected in Y direction only. It is preferable to also effect both the detection of displacement and the correction of the deviation of the rotational center of the rotary shaft 31 in X direction for the purpose of correcting the deviation of the rotational center with a higher accuracy.

Figures 9, 10:
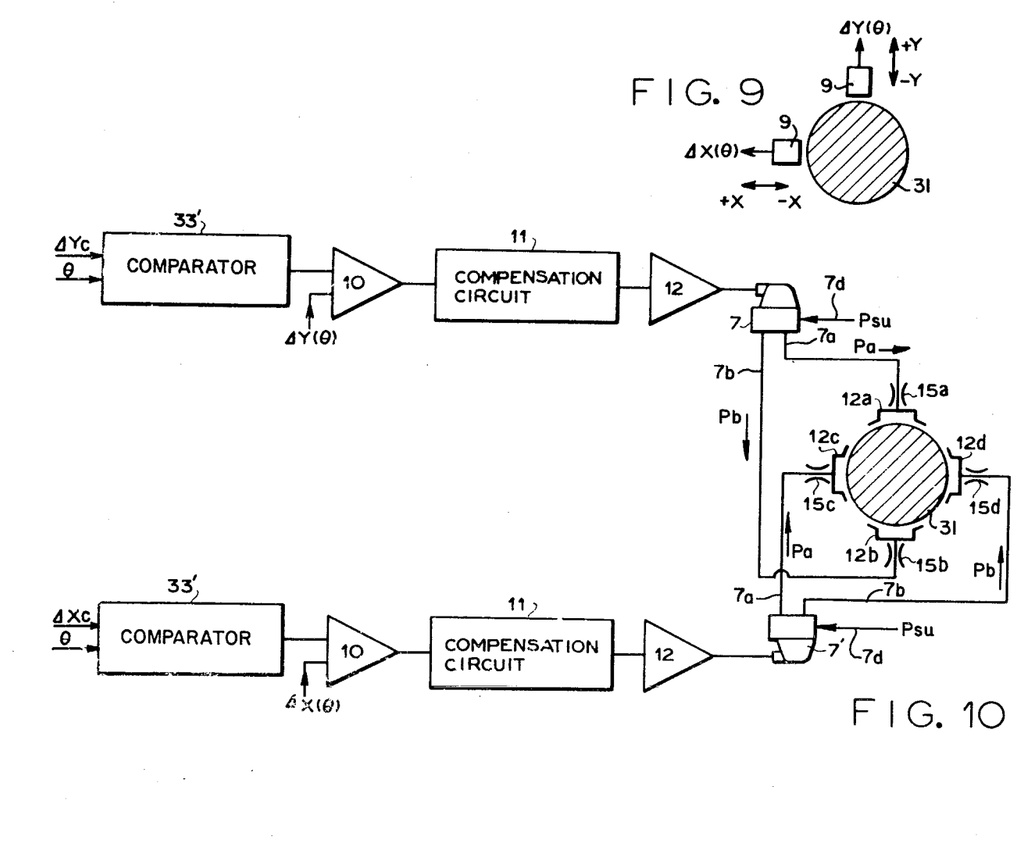
FIG. 9 is a schematic cross sectional view of a further embodiment of a servo control system according to the invention.
FIG. 10 is a schematic cross sectional view of the system shown in FIG. 9 and provided with a position correcting mechanism shown in FIGS. 6 to 8.

FIGS. 9 and 10 show a further embodiment of a servo control system according to the invention which can position the rotary shaft 31 to correct the position of the rotary shaft 31 in both Y and X directions. In the present embodiment, provision is made of the displacement detector 9' for detecting the displacement of the rotary shaft 31 in X direction in addition to the above described displacement detector 9 for detecting the displacement of the rotary shaft 31 in Y direction as shown in FIG. 9. In addition, provision is made of a servo control system for correcting the deviation of the rotary shaft 31 in X direction, which is the same as the above described servo control system in Y direction as shown in FIG. 6. Both mechanisms are substantially the same in construction and operation, so that the parts of the servo control system in X direction are designated by the same reference numerals with prime as those of the servo control system for correcting the deviation of the rotational center of the rotary shaft 31 in Y direction as shown in FIG. 10.

In addition, the hydrostatic pads 13a and 13d for supporting the right end of the rotary shaft 31 shown in FIGS. 6 and 8 may also be provided the servo control system for correcting the deviation of the rotational center of the rotary shaft 1 in Y direction or with the same in both X and Y directions so as to correct the deviation of the rotational center at both ends of the rotary shaft 1. In this case, it is possible to obtain a higher rotatory accuracy of the rotary shaft 1.

Figure 11:
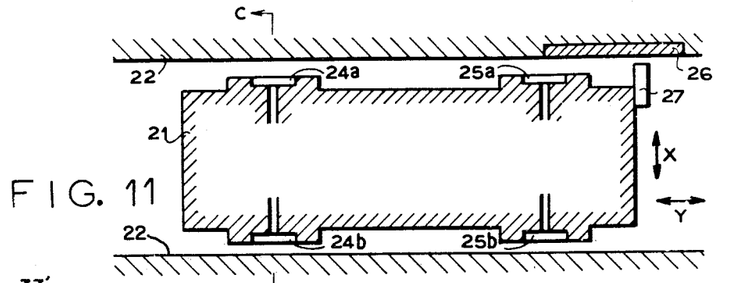
FIG. 11 is a schematic transverse sectional view of a still further embodiment of a servo control system according to the invention.
Figure 12:
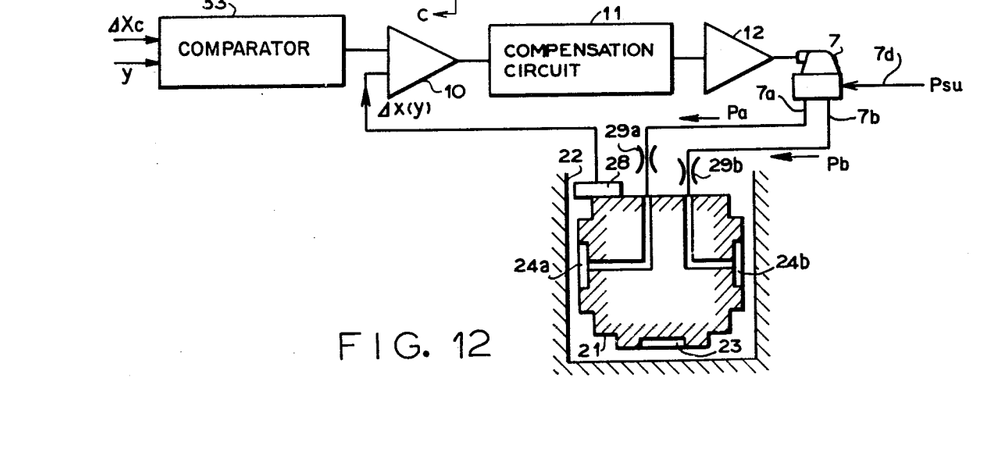
FIG. 12 is a section along line C—C of FIG. 11.

FIGS. 11 and 12 show a still further embodiment of a servo control system according to the invention which can correct the displacement of member 21 so as to effect a linear movement along a guide surface 22. In the present embodiment, the member 11 is provided at its lower surface with a hydrostatic pad 23 for supporting it at a given height and at its side surfaces with two sets of hydrostatic pads 24a, 24b and 25a, 25b for supporting the member 21 in X direction perpendicular to the guide surface 22.

If the member 21 is subjected to the driving force from a driving mechanism as a table of a machine tool not shown, the movable body 21 can move in Y directions which is in parallel with the guide surface 22. The movement position of the member 21 in Y directions is detected by the detector 27 fixed to the right end of the member 21 relative to a scale 26 fixed to the guide surface 22. The position of the member 21 in X direction is detected by a displacement detector 9 secured to the upper surface of the member 21 as shown in FIG. 12. The hydrostatic pads 24a and 24b are supplied with the pressures Pa, Pb from the servovalve 7 through restrictors 29a and 29b, respectively. In order to control these pressures Pa, Pb, provision is made of a comparator 33', differential amplifier 10, compensation circuit 11 and servo amplifier 12. These elements are substantially the same as those of the previous embodiments and hence are designated by the same reference numerals as those of the previous embodiments, respectively, and description of these elements is omitted. The comparator 33' functions to reference position memorize a signal ΔXc which has been produced beforehand for the purpose of correcting the zigzag movement of the member 21 in X directions within a range of movement of the member 1 in Y directions and to generate a linear movement position reading signal ΔXc(y) in response to a displacement signal y delivered from the detector 27 in Y direction. The differential amplifier 10 functions to obtain a difference between the linear movement position reading signal ΔXc(y) and a linear movement position comparison reference signal ΔX(y) delivered from the displacement detector 9. If the ratio of the pressure Pa to the pressure Pb becomes changed, the difference pressure between the hydrostatic pads 24a and 24b becomes out of balance.

As a result, the member 21 is moved in X direction. This displacement of the member 21 in X direction is effected as compared with reference position signal ΔXc in such direction that the displacement of the member 21, that is, zigzag movement of the member 21 is eliminated. As a result, it is possible to automatically correct the zigzag movement of the member 21 and eliminate it with a high accuracy.

The hydrostatic pads 25a and 25b may be supplied with a constant pressure, but may be provided with the servo control system shown in FIG. 12 to correct the zigzag movement of the right end of the member 21.

In the present embodiment, the displacement of the movable member 21 is detected as the displacement thereof relative to the guide surface 22. Alternatively, provision may be made of a reference surface having a high precision instead of the guide surface 22 and the displacement of the member 21 may be detected as the displacement thereof relative to this reference surface, thereby rendering it possible to position the member 21 in a more accurate manner.

In the above described embodiments, the reference position signals are determined on the basis of the result obtained by measuring beforehand the amount of the deviation or zigzag movement of the controlled object. Since the amount of rotatory oscillation or zigzag movement of the controlled object supported by the hydrostatic pads is dependent on the accuracy in configuration of each element of the hydrostatic supporting mechanism, the correction signals can analytically be determined by the result obtained by accurately measuring the accuracy in configuration of these elements. The restrictors 15a 15d, 16a–16u d, 8, 8', 29, 29a and 29b inserted between the servovalve and each of the hydrostatic pads may eventually be omitted by taking the characteristics of the servovalve into consideration.

As stated hereinbefore, the invention is capable of correcting such as a rotary shaft or a on the basis of a relative relation between a predetermined reference singal and a practical position of the controlled object irrespective of accuracy required for machining the controlled object to be controlled and provides a servo control system for the controlled object which is accurate in correction and stable in operation.

What is claimed is:
1. A servo control system with closed loop control means for correcting a displacement of a member caused by an external force, said system comprising:
   (a) base means as a foundation;
   (b) supporting means secured to said base means for supporting said member;
   (c) first and second hydrostatic pads provided on said supporting means for hydrostatically supporting said member with said supporting member;
   (d) a displacement detector detecting an amount of the displacement of said member relative to said supporting means and transmitting a position reading signal;
   (e) a reference signal generator generating a reference position signal;
   (f) a differential amplifier connected to said displacement detector and said reference signal generator for transmitting a difference signal between said position reading signal and said reference position signal;
   (g) servo amplifier connected to said differential amplifier for amplifying said difference signal of said differential amplifier; and
   (h) a servovalve supplying an operating pressure corresponding to said difference signal delivered from said differential amplifier to said first and second hydrostatic pads.

2. The servo control system according to claim 1 further comprising a restrictor between said servovalve, and said first and second hydrostatic pads.

3. The servo control system according to claim 2 further comprising a third hydrostatic pad provided on said supporting means for controlling said member upward and downward, said third hydrostatic pad having a restrictor associated therewith.

4. A servo control system with a closed loop control means for correcting a displacement caused by an external force, said system comprising:
   (a) base means as a foundation;
   (b) supporting means secured to said base means for supporting said member;
   (c) first and second hydrostatic pads provided on said supporting means for hydrostatically supporting said member with said supporting member;
   (d) a first detector detecting an amount of displacement of said member relative to said supporting means and transmitting a position reading signal;
   (e) a reference signal generator generating a reference position signal;
   (f) a second detector detecting a motion position of said member and transmitting a motion position reading signal;
   (g) a comparator comparing said reference position signal and said motion position reading signal so as to transmit a comparison position reference signal;
   (h) a differential amplifier connected to said first detector and to said reference signal generator for transmitting a difference signal between said position reading signal and said comparison position reference signal;
   (i) a servo amplifier connected to said differential amplifier for amplifying said difference signal of said differential amplifier; and
   (j) a servovalve supplying an operating pressure corresponding to said difference signal delivered from said differential amplifier to said first and second hydrostatic pads.

5. The servo control system according to claim 4 wherein said second detector detects a rotational angle of said member so as to transmit a rotational angle reading signal.

6. The servo control system according to claim 4 wherein said second detector detects a linear motion of said member so as to transmit a linear motion position reading signal.

* * * * *